Nov. 13, 1928.
P. ELLER ET AL
1,691,709
SAFETY DEVICE FOR AEROPLANES
Filed Dec. 27, 1927
2 Sheets-Sheet 1
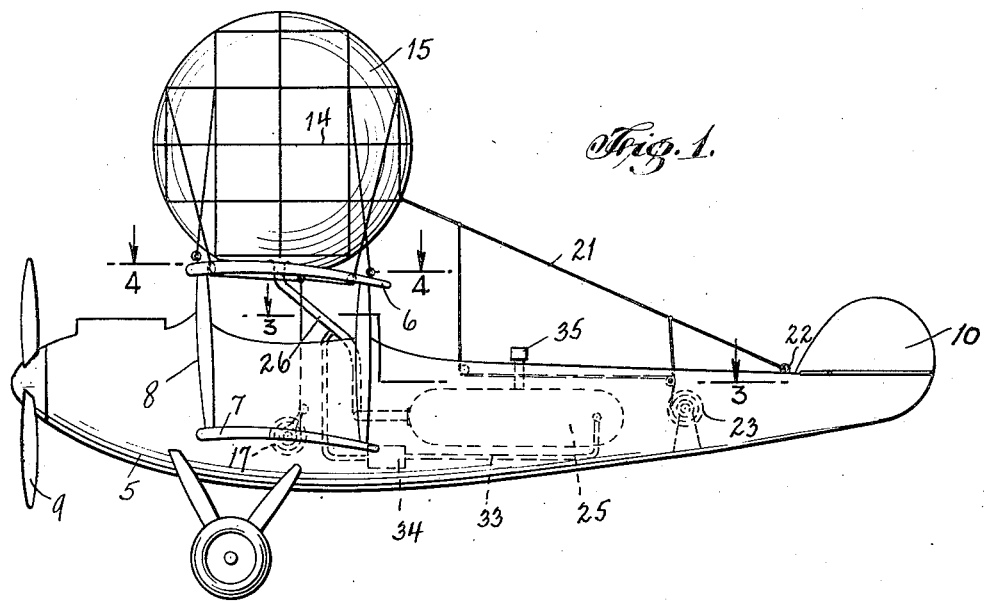
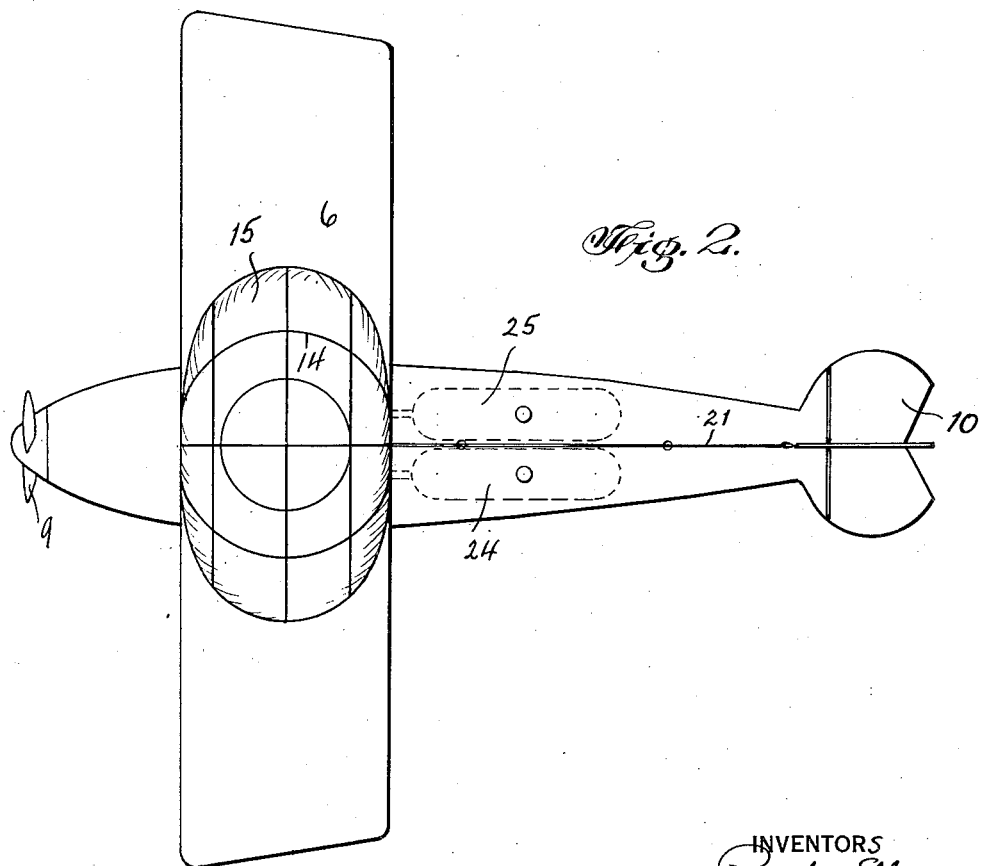
INVENTORS
Piroska Eller
BY John Eller
Aaron L. Applebaum
ATTORNEY Nov. 13, 1928.

P. ELLER ET AL 1,691,709

SAFETY DEVICE FOR AEROPLANES

Filed Dec. 27, 1927

INVENTORS
Piroska Eller
BY John Eller
Aaron L. Applebaum
ATTORNEY

Patented Nov. 13, 1928.

1,691,709

UNITED STATES PATENT OFFICE.

PIROSKA ELLER AND JOHN ELLER, OF NEW YORK, N. Y.

SAFETY DEVICE FOR AEROPLANES.

Application filed December 27, 1927. Serial No. 242,717.

The invention relates to safety devices for aeroplanes and hydroplanes having for its object to provide a releasable envelope or balloon capable of being quickly inflated and of sufficient capacity to support the weight of the machine.

One of the objects of our invention is to provide a safety device for aircraft of the heavier than air type, including provision for supporting and inflating an envelope or balloon from helium filled tanks suitably located and carried by the machine.

Another object of our invention is to provide a safety device for aeroplanes, hydroplanes and the like in which a collapsible and inflatable envelope or balloon is located on the top of the wings of the machine, said envelope or balloon having an outer network and attached cables whereby they may be released and further provision for quickly inflating and deflating the envelope or balloon from helium storage tanks carried by the machine.

To enable others skilled in the art to more fully comprehend the underlying features of our invention, reference is had to the accompanying drawing forming a part of this specification in which Fig. 1 is a side view showing my invention as applied to an aeroplane, the envelope or balloon being inflated.

Fig. 2 is a plan.

Figure 3:
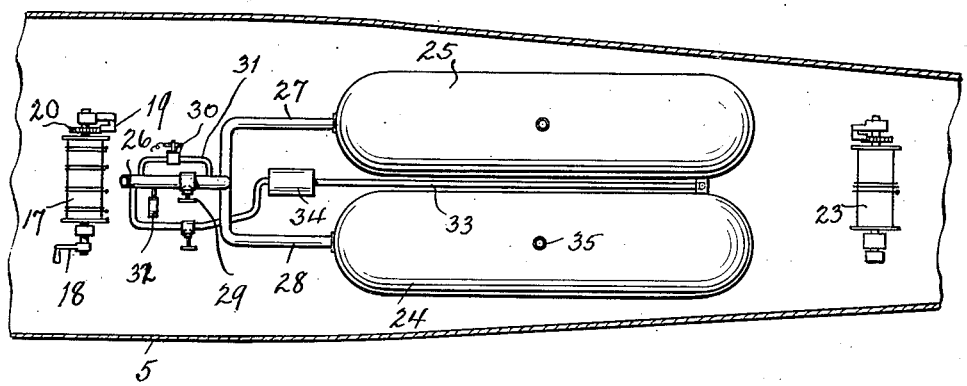
Fig. 3 is a section taken on the line 3—3 of Fig. 1.

Referring now to the drawings, 5 designates the body or fuselage of either an aeroplane or hydroplane, 6, 7 the top and bottom wings connected by struts 8. The front propeller is indicated by numeral 9 and the rear steering rudder by numeral 10.

Figure 4:
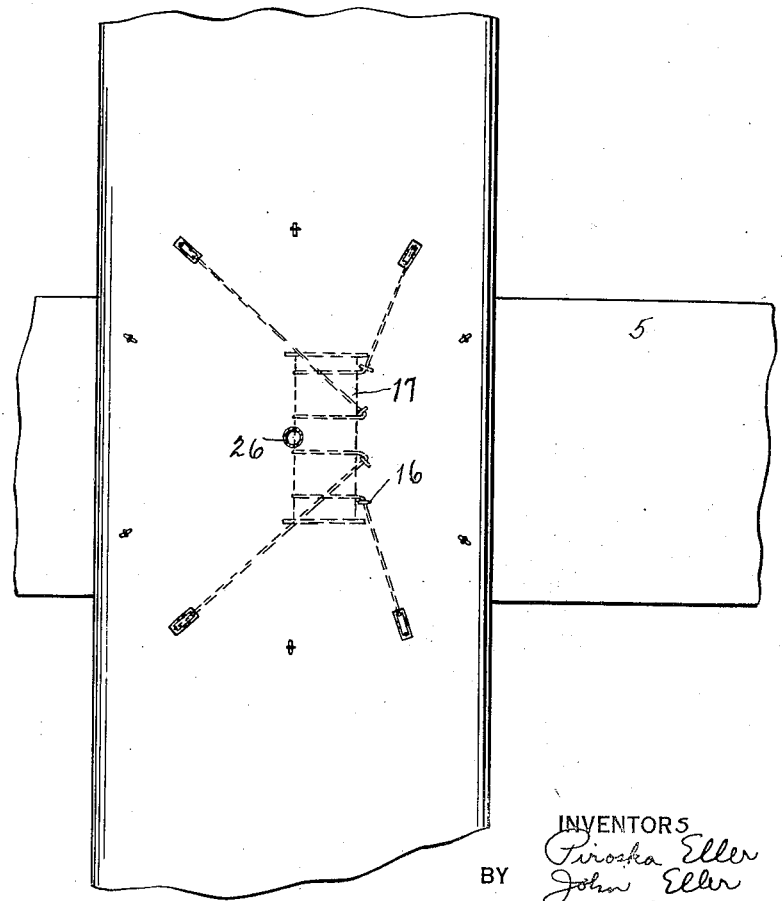
Fig. 4 is a section on an enlarged scale and taken on the line 4—4 of Fig. 1.

Referring particularly to Figs. 1 and 4 of the drawings, we have shown the top wing 6 provided with means for positioning a net work 14 inclosing an envelope or balloon, said envelope or balloon being inflatable and adapted to be deflated, as will subsequently appear. The net work and balloon are held in position by a series of main cables preferably 6 in number, fastened thereto, one end of each cable being connected to a hook or eye on the wing proper and fastened through suitable rings of the net. A series of cables, preferably 4 in number are connected to the net passing over suitable rollers and wound on a winch 17, located within the fuselage. The winch may be operated by a crank handle 18 being equipped with a ratchet or pawl mechanism 19, 20 for the purpose well understood. The network is connected by a rearwardly extending balancing cable 21 connected to an eye 22 and passing over suitable guide rollers whereby it may be wound on an automatic spring winch 23.

The balloon is in communication with helium tanks 24, 25 through an inlet pipe connected through branch pipes 27, 28 equipped with a control valve 29 which when opened, permits the helium to enter and inflate the envelope or balloon. When it is desired that the balloon be inflated gradually, a valve 30 may be opened in a by-pass conduit 31 and the pressure may be determined by a gauge 32.

The inlet pipe 26 is also connected by a return pipe 33 leading to the helium storage pipes whereby the balloon or envelope may be quickly deflated by means of an automatic suction or pressure pump 34. Each tank is provided with the usual entrance opening 35 for the introduction of the helium.

From the above description taken in connection with the drawings, the operation of the safety device will be clearly understood. If the machine is operating at a high altitude and there is sufficient time to inflate the balloon or envelope, the valve in the by-pass conduit may be opened and the balloon fills gradually. On the other hand, if the machine is at a low altitude and it is desired to quickly inflate the balloon, the main valve controlling the inlet pipe may be opened to fill the balloon completely. The size of the balloon required is of course dependent upon the weight of the machine and the net work is so constructed that if the machine again picks up speed, by closing the main valve or the by-pass valve and starting the pump, the balloon may be deflated during sustained flight, thus decreasing the air resistance offered by the balloon and its envelope.

While we have shown and described our invention with some degree of particularity, we realize that in practice various alterations therein may be made. We therefore reserve the right and privilege of changing the form of the details of construction or otherwise altering the arrangement of the correlated parts without departing from the spirit of the invention or the scope of the subject matter being claimed.

Having shown and described our invention, what we claim as new and desire to secure by Letters Patent is:

1. A safety device of the class described in combination with the fuselage and wings of a machine, an envelope or balloon having an outer network supported on the top wings, cables connected to said network, certain of said cables passing through the top wings and adapted to be wound on a winch, an inlet pipe and gas storage tanks in communication therewith for inflating said envelope or balloon and means for deflating said envelope or balloon.

2. A safety device of the class described in combination with the fuselage and wings of a machine, an envelope or balloon having an outer network supported on the top wings, cables connected to said network, certain of said cables passing over rollers and through the top wings and adapted to be wound on a winch, pawl and ratchet mechanism for said winch, a rear cable attached to the network adapted to be wound on an independent winch, storage tanks and a common inlet pipe leading to the envelope or balloon, a control valve in said inlet pipe and a pump for deflating said envelope or balloon.

In testimony whereof we affix our signatures.

PIROSKA ELLER.
JOHN ELLER.